United States Patent
Oyama

(10) Patent No.: US 10,771,695 B2
(45) Date of Patent: Sep. 8, 2020

(54) ELECTRONIC APPARATUS, METHOD FOR CONTROLLING THE SAME, AND RECORDING MEDIUM, FOR CONTROLLING POWER CONSUMPTION

(71) Applicant: CANON KABUSHIKI KAISHA, Tokyo (JP)

(72) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/052,895

(22) Filed: Aug. 2, 2018

(65) Prior Publication Data
US 2019/0045134 A1    Feb. 7, 2019

(30) Foreign Application Priority Data

Aug. 4, 2017  (JP) ................. 2017-151795

(51) Int. Cl.
*H04N 5/232*    (2006.01)
*G03B 13/02*    (2006.01)

(52) U.S. Cl.
CPC ....... *H04N 5/232411* (2018.08); *G03B 13/02* (2013.01); *H04N 5/232* (2013.01); *H04N 5/23216* (2013.01); *H04N 5/23245* (2013.01); *H04N 5/23293* (2013.01)

(58) Field of Classification Search
CPC ......... H04N 5/232411; H04N 5/23293; H04N 5/232; H04N 5/23216; H04N 5/23245; H04N 5/23241; G03B 13/02
See application file for complete search history.

(56) References Cited

U.S. PATENT DOCUMENTS

| | | | |
|---|---|---|---|
| 6,384,572 B1* | 5/2002 | Nishimura | H02J 7/0004 320/106 |
| 2007/0030375 A1 | 2/2007 | Ogasawara | |
| 2014/0176736 A1* | 6/2014 | Sato | H04N 1/00344 348/207.11 |

(Continued)

FOREIGN PATENT DOCUMENTS

| | | |
|---|---|---|
| CN | 102176733 A | 9/2011 |
| CN | 104853053 A | 8/2015 |

(Continued)

*Primary Examiner* — Gevell V Selby
(74) *Attorney, Agent, or Firm* — Canon U.S.A., Inc. I.P. Division

(57) ABSTRACT

An electronic apparatus includes an approach detection unit detecting approach of an object to an approach section, an operation detection unit detecting an operation on an operation unit, and a controller performing display in a display unit in a finder viewable through a finder section when the approach is detected in a case where a predetermined. state in which the operation unit is not operated is continued for less than first and second period of times, entering a first state in which the approach is detected but display in the display unit is not performed, when a nonoperation state of the operation unit is continued for the first period of time, and entering a second state in which power consumption is smaller than that in the first state, when the predetermined state in which the nonoperation state of the operation unit is continued for the second period of time.

13 Claims, 14 Drawing Sheets

(56) References Cited

U.S. PATENT DOCUMENTS

| | | | |
|---|---|---|---|
| 2015/0381883 A1* | 12/2015 | Kawai | H04N 5/23293 |
| | | | 348/333.08 |
| 2016/0195916 A1* | 7/2016 | Shiozaki | H04N 5/23293 |
| | | | 348/333.13 |
| 2017/0155826 A1* | 6/2017 | Nakagawa | H04N 5/23212 |
| 2018/0041736 A1* | 2/2018 | Gagnon | H04N 5/23241 |

FOREIGN PATENT DOCUMENTS

| | | |
|---|---|---|
| CN | 106814838 A | 6/2017 |
| JP | 2000165705 A | 6/2000 |
| JP | 2004-201104 A | 7/2004 |

* cited by examiner

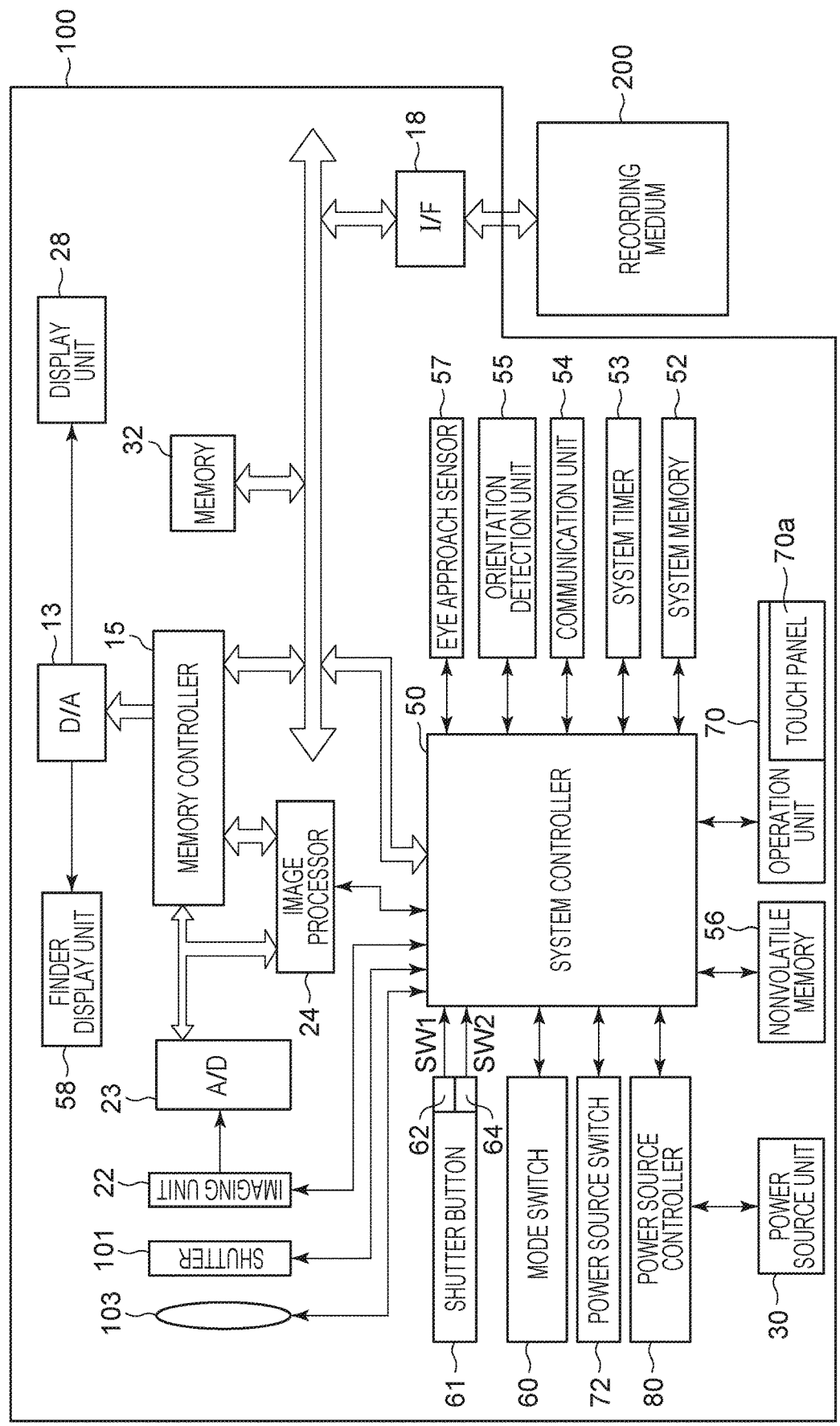

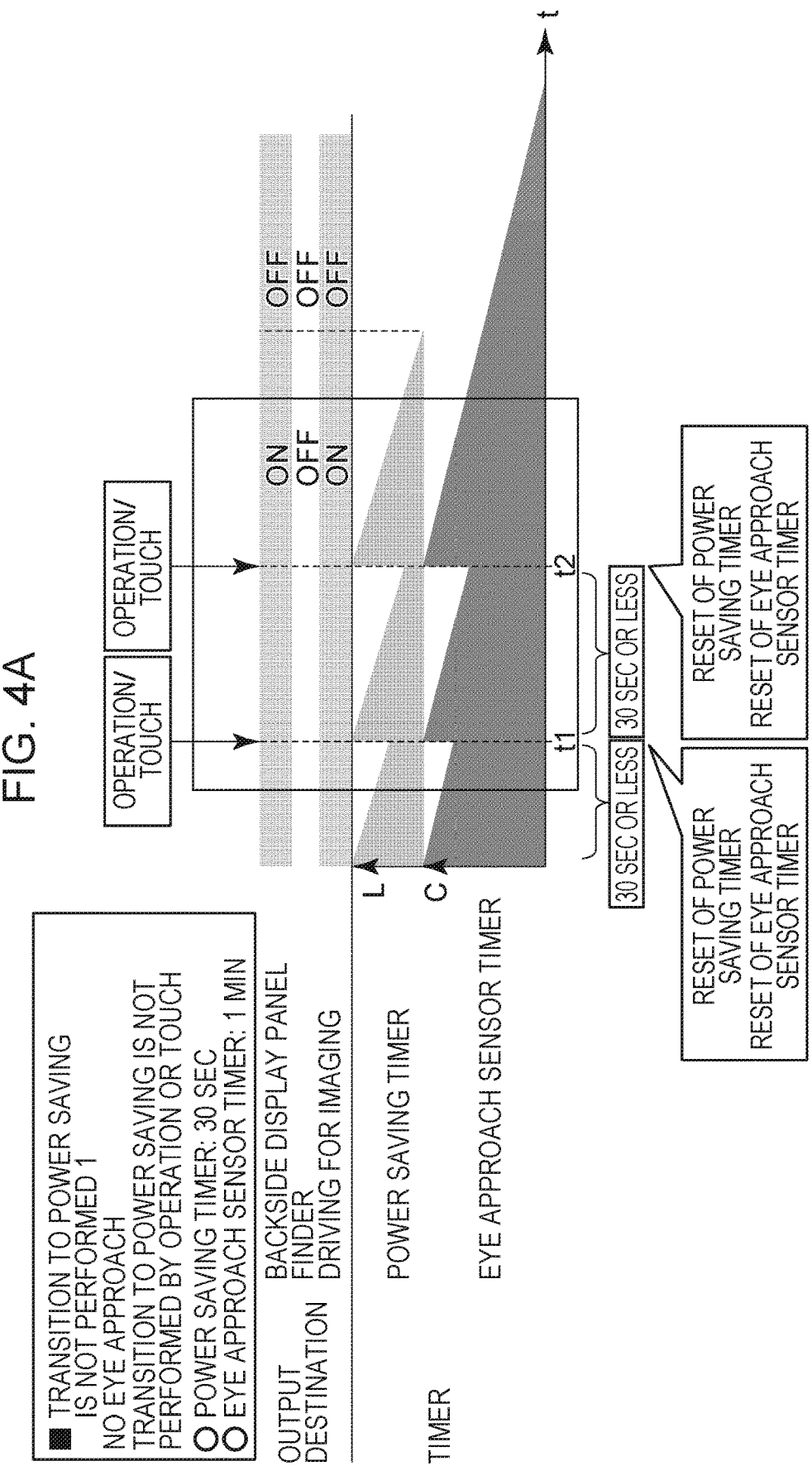

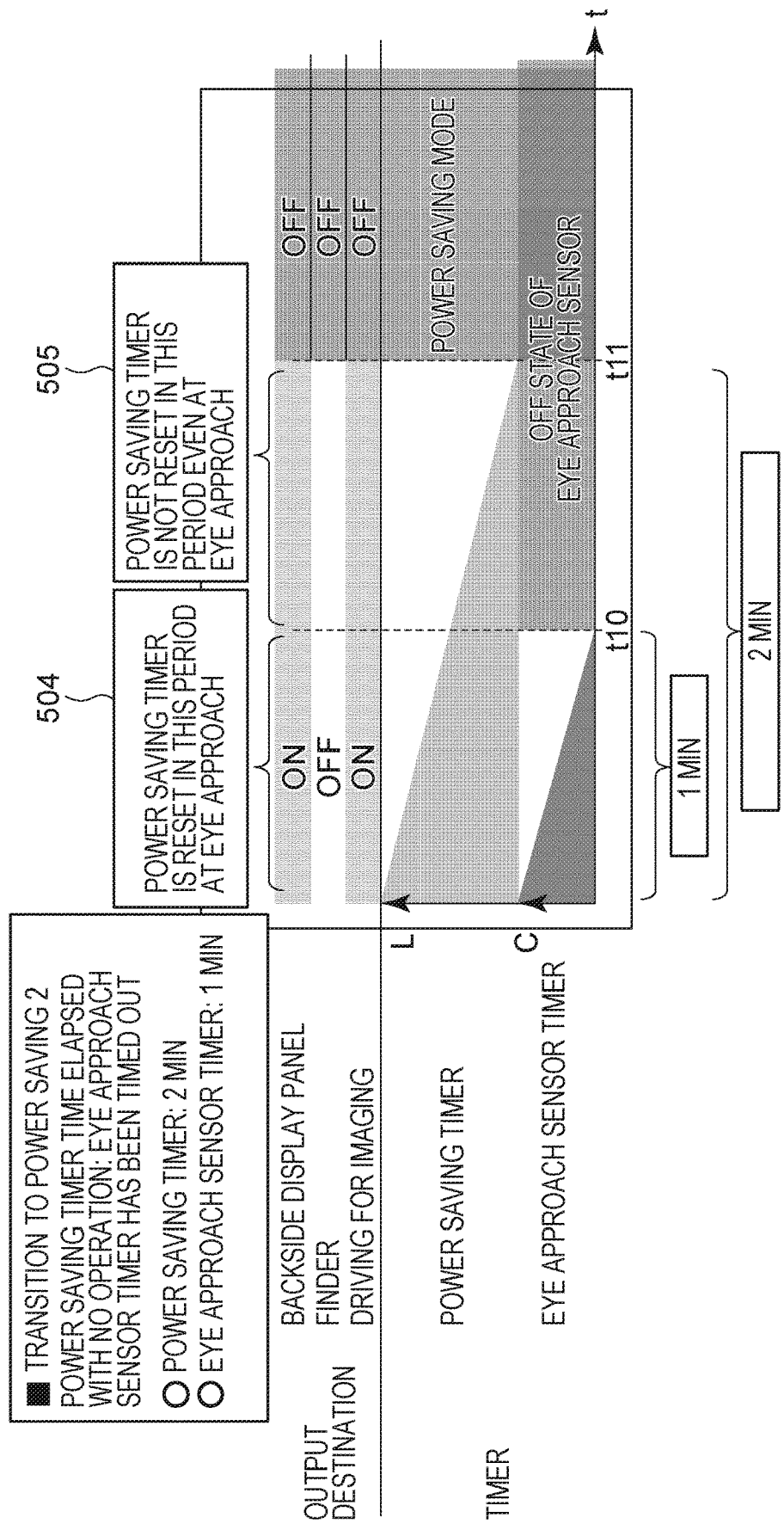

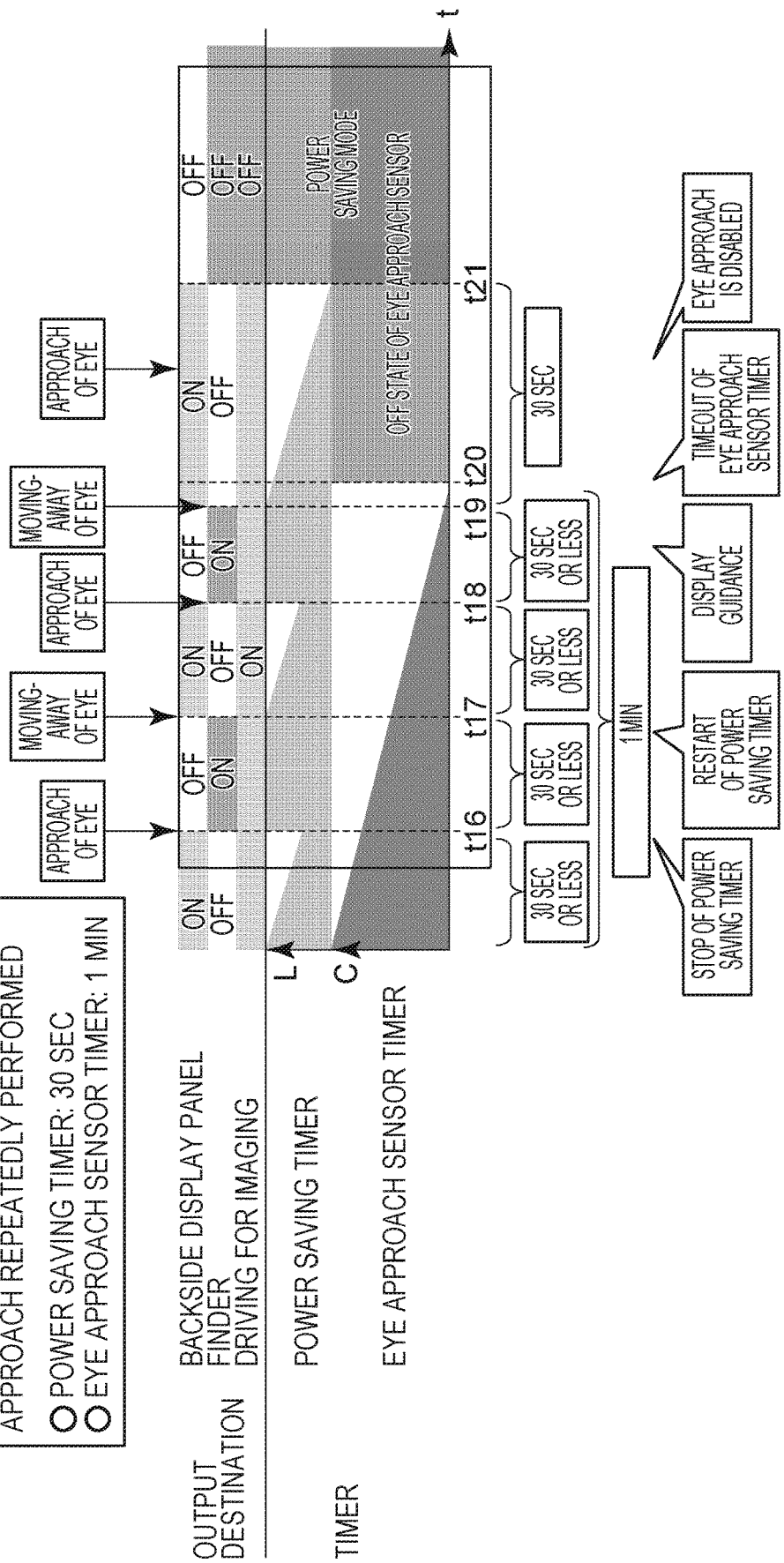

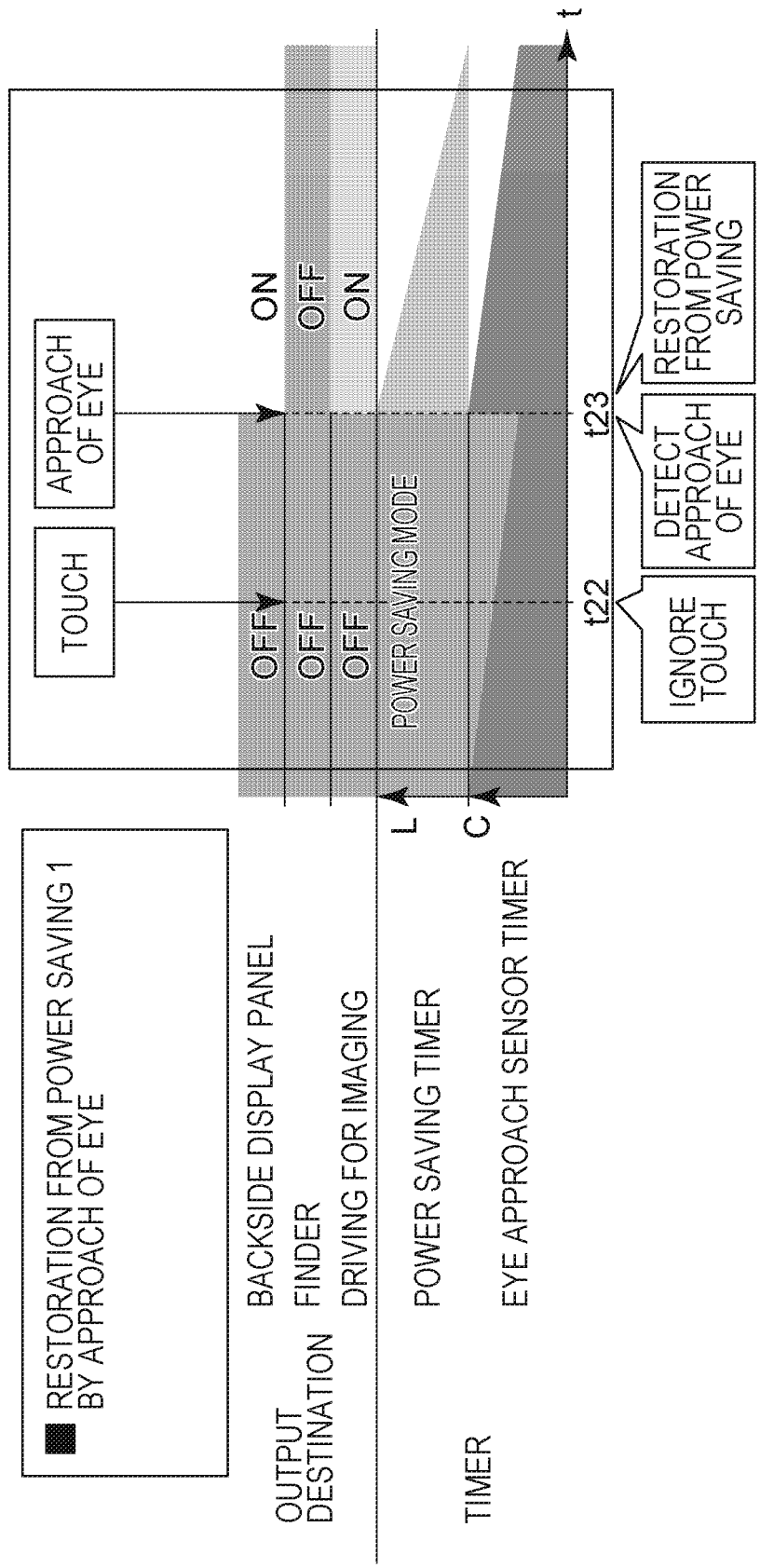

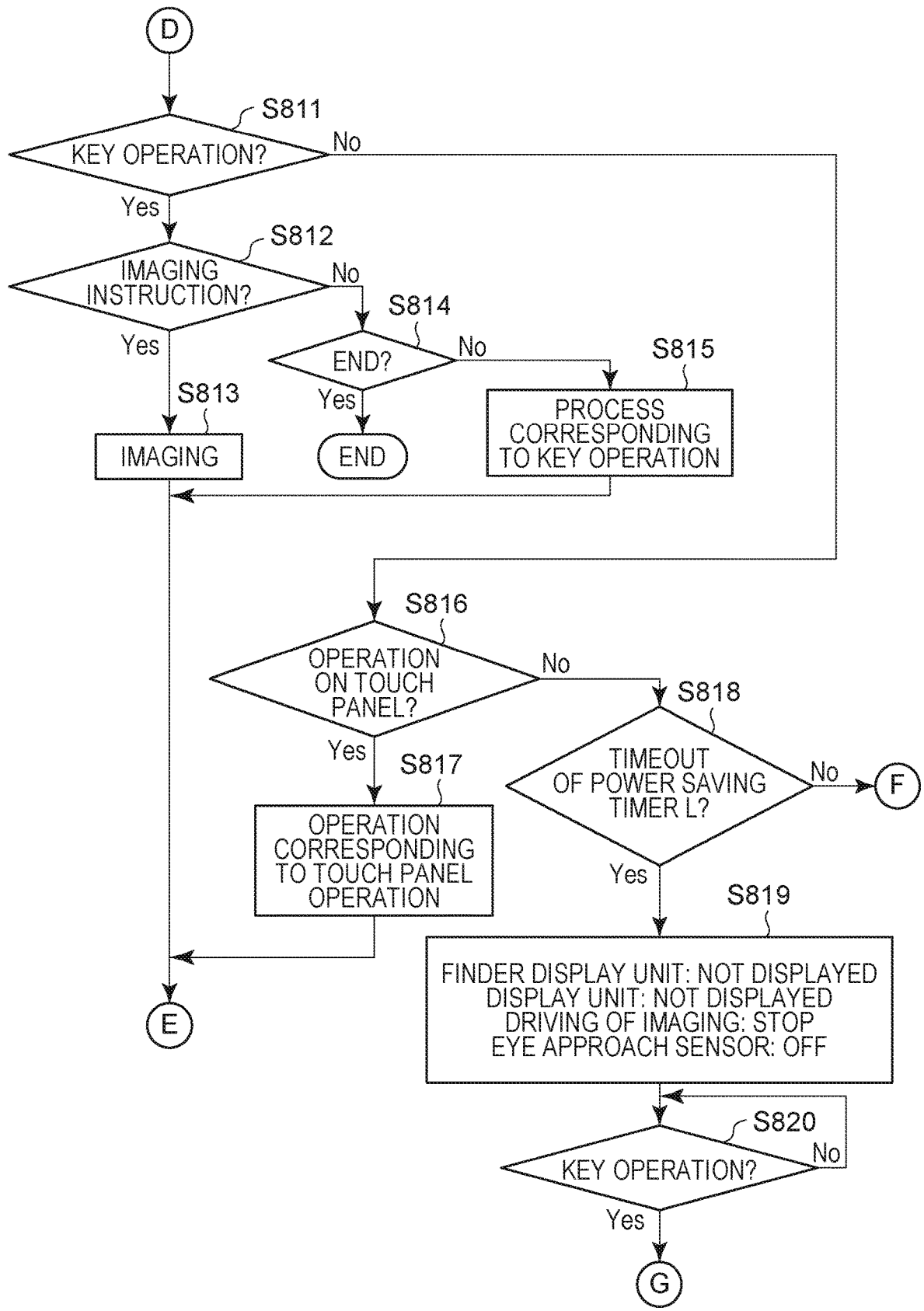

ELECTRONIC APPARATUS, METHOD FOR CONTROLLING THE SAME, AND RECORDING MEDIUM, FOR CONTROLLING POWER CONSUMPTION

BACKGROUND OF THE INVENTION

Field of the Invention

The present disclosure relates to an electronic apparatus capable of detecting approach of an object to an approach section, a method for controlling the electronic apparatus, and a recording medium.

Description of the Related Art

A method for blocking power supply for power saving when a period of time in which a user operation is not performed is continued has been employed. Japanese Patent Laid-Open No. 2000-165705 discloses an operation of blocking power supply when at least 10 minutes has elapsed after an operation and approach of an eye to a finder is not detected and clearing an auto power off timer when approach of an eye is detected so that the power supply is not blocked during use of the finder.

A user may carry a digital still camera hanging around a user's neck or a user's shoulder. In the method disclosed in Japanese Patent Laid-Open No. 2000-165705, when the user carries a digital still camera hanging around the user's neck or a user's shoulder, approach of an eye to a finder is detected, and therefore, it is difficult to perform auto power off. Accordingly, power consumption may be increased.

SUMMARY OF THE INVENTION

The present disclosure provides an electronic apparatus capable of preventing accidental increase of power consumption when approach of an object to an approach section, such as an eye approach unit, is detected.

According to an aspect of the present disclosure, an electronic apparatus includes an approach detection unit configured to detect approach of an object to an approach section, an operation detection unit configured to detect an operation performed on an operation unit, and a controller configured to performs display in a display unit included in a finder viewable through a finder section when approach of an object to the approach section is detected in a case where a predetermined state in which the operation unit is not operated is continued for less than a first period of time and less than a second period of time, enter a first state in which the approach of the object to the approach section is detected but display in the display unit included in the finder is not performed, when the predetermined state in which the operation unit is not operated is continued for the first period of time, and enter a second state in which power consumption of the electronic apparatus is smaller than that in the first state, when the predetermined state in which the operation unit is not operated is continued for the second period of time.

Further features of the present invention will become apparent from the following description of exemplary embodiments with reference to the attached drawings.

BRIEF DESCRIPTION OF THE DRAWINGS

FIG. 2 is a block diagram illustrating a configuration of the digital still camera as the example of the apparatus to which the configuration of the embodiment s to be applied.

FIGS. 4A and 4B are diagrams illustrating a state in which a power saving timer and an eye approach sensor timer are timed out according to the first embodiment.

FIGS. 5A and 5B are diagrams illustrating a state of restoration or reset from a power saving state according to the first embodiment.

FIGS. 6A and 6B are diagrams illustrating the relationship between an eye approach state and count of the power saving timer and the eye approach sensor timer according to the first embodiment.

FIGS. 7A and 7B are diagrams illustrating a state of restoration from the power saving state according to the first embodiment.

FIGS. 8A and 8B are a flowchart of a power saving transition process according to a second embodiment.

DESCRIPTION OF THE EMBODIMENTS

Figure 1:
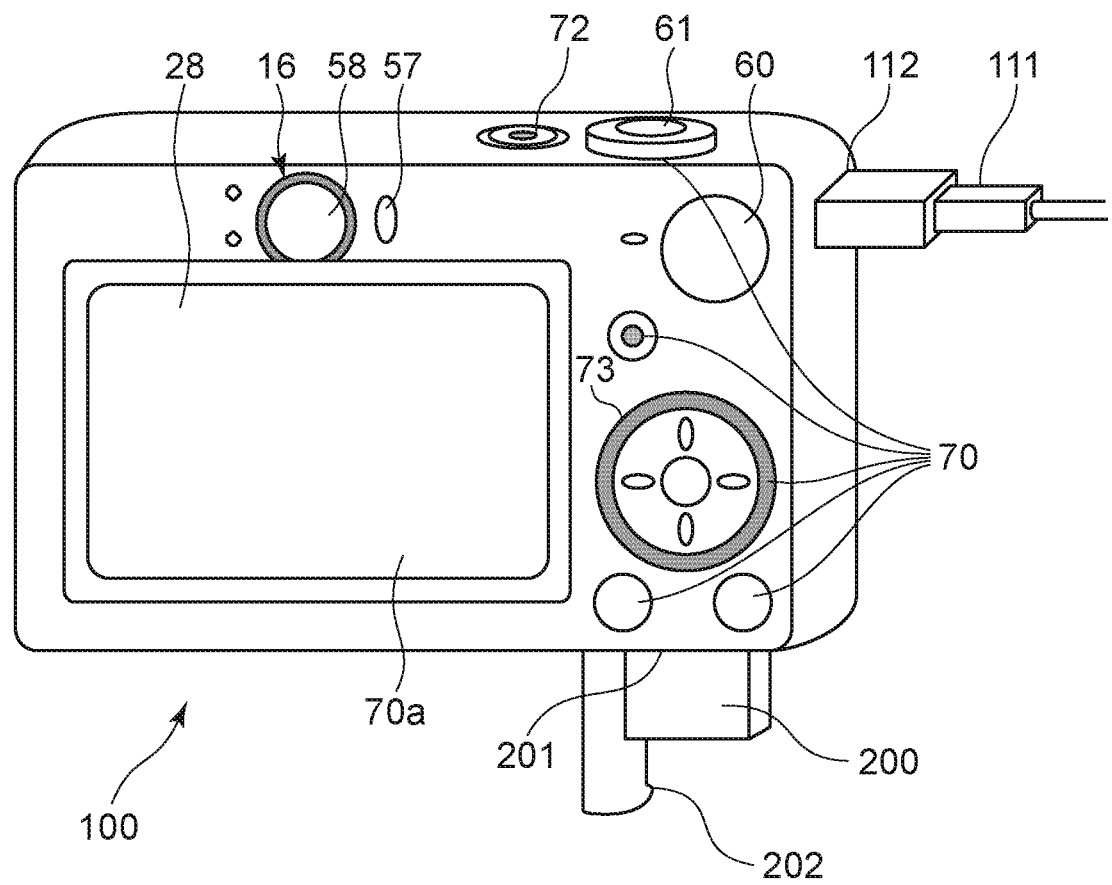
FIG. 1 is a diagram illustrating appearance of a digital still camera as an example of an apparatus to which a configuration of an embodiment is to be applied.

Hereinafter, preferred embodiments of the present disclosure will be described with reference to the accompanying drawings. FIG. 1 is a diagram illustrating appearance of a digital still camera 100 as an example of an embodiment.

A display unit 28 displays images and various information and includes a touch panel 70a. As with the display unit 28, a finder display unit 58 is an electronic view finder capable of displaying images and various information. An eye approach sensor 57 which detects approach of an object to a finder 16 (an approach section or a finder section) switches a display output destination between the display unit 28 and the finder display unit 58 depending on a result of a determination as to whether eye approach has been detected. When the user brings an eye close to the finder 16 to look into the finder 16, for example, the eye approach sensor 57 detects approach of an object and display is switched from the display unit 28 to the finder display unit 58 (viewable). Note that the term "approach" includes contact in this embodiment.

A shutter button 61 is an operation unit for performing an imaging instruction. A mode switch 60 is an operation unit for performing switching among various modes. A connector 112 is used to connect a connection cable 111 used for connection with an external apparatus, such as a personal computer or a printer, and the digital still camera 100 to each other, An operation unit 70 (an operation detection unit) includes operation members including various switches, buttons, and the touch panel 70a which accept various operations performed by the user. A controller wheel 73 is a rotatable operation member included in the operation unit 70. A power source switch 72 is a button to be pressed for performing switching between power-on and power-off. The operation unit 70 also includes a menu button and a reproducing button (not illustrated).

Examples of a recording medium 200 include a memory card and a hard disk. A recording medium slot 201 accommodates the recording medium 200. The recording medium 200 accommodated in the recording medium slot 201 is capable of communicating with the digital still camera 100 and capable of performing recording and reproducing. A rid 202 covers the recording medium slot 201. In FIG. 1, a state in which the rid 202 is opened and a portion of the recording medium 200 is withdrawn and exposed from the recording medium slot 201 is illustrated.

FIG. 2 is a block diagram illustrating an example of a configuration of the digital still camera 100 according to this embodiment. In FIG. 2, an imaging lens 103 is a lens group including a zoom lens and a focus lens.

A shutter 101 has an aperture function. An imaging unit 22 is an imaging element configured by a charge-coupled device (CCD) or a complementary metal-oxide semiconductor (CMOS) element which converts an optical image into an electric signal. An A/D converter 23 converts an analog signal into a digital signal. The A/D converter 23 is used to convert an analog signal output from the imaging unit 22 into a digital signal. The configuration associated with imaging described above including the imaging unit 22 is activated in a normal state and outputs a captured image (a live-view image). However, the configuration stops in a power saving state.

An image processor 24 performs a resizing process including pixel interpolation and size reduction and a color conversion process on data supplied from the A/D converter 23 or data supplied from a memory controller 15. Furthermore, the image processor 24 performs a predetermined calculation process using captured image data, and a system controller 50 performs exposure control and ranging control based on an obtained result of the calculation. In this way, an autofocus (AF) process, an auto-exposure (AE) process, and a flash preliminary light emission (EF) process of a through-the-lens (TTL) method are performed. The image processor 24 further performs a predetermined calculation process using the captured image data and performs an auto-white balance (AWB) process of the TTL method based on an obtained result of the calculation.

Data output from the A/D converter 23 is directly written in a memory 32 through the image processor 24 and the memory controller 15 or only through the memory controller 15. The memory 32 stores image data which is obtained by the imaging unit 22 and which is converted into digital data by the A/D converter 23 and image data to be displayed in the display unit 28. The memory 32 has storage capacity sufficient for storing a predetermined number of still images, moving images for a predetermined period of time, and audio. Furthermore, the memory 32 also serves as a memory for image display (a video memory).

A digital/analog (D/A) converter 13 converts data for image display stored in the memory 32 into an analog signal to be supplied to the display unit 28. In this way, the image data for display written in the memory 32 is displayed by the display unit 28 or the finder display unit 58 through the D/A converter 13. The display unit 28 or the finder display unit 58 performs display on a display device, such as a liquid crystal display (LCD) or an organic electro luminescence display, in accordance with the analog signal supplied from the D/A converter 13. The system controller 50 may determine whether display is performed using the display unit 28 or the finder display unit 58. Although a description is made provided that the finder display unit 58 is an electronic view finder, an optical finder may be employed instead of the electronic view finder. In a case where the optical finder is employed, a captured image is displayed in the display unit 28 when a mirror moves up whereas an optical image is viewable through the finder when the mirror moves down. Furthermore, in the case where the optical finder is employed, the finder display unit 58 is a liquid crystal panel, and therefore, it is recognized that a setting value and an AF frame of imaging are superposed on the optical image.

A nonvolatile memory 56 is a memory as an electrically removable and recordable recording medium, such as an electrically erasable programmable read only memory (EEPROM). The nonvolatile memory 56 stores constants, programs, and the like for operation of the system controller 50. Here, the term "programs" indicates computer programs for executing various flowcharts described below in this embodiment.

The system controller 50 controls the entire digital still camera 100. When the programs recorded in the nonvolatile memory 56 are executed, various processes described below in this embodiment are realized. A random access memory (RAM) is used as a system memory 52. In the system memory 52, constants and variables for the operation of the system controller 50 and the programs read from the nonvolatile memory 56 are developed. Furthermore, the system controller 50 controls the memory 32, the D/A converter 13, the display unit 28, and the like, and in addition, performs display control on the display unit 28 and the finder display unit 58 taking eye-approach detection information of the eye approach sensor 57 into consideration.

A system timer 53 is a time measurement unit which measures time used for various control processes and time of an incorporated clock. The system timer 53 measures time of a timer for power saving or a timer for the eye approach sensor 57.

The mode switch 60, the shutter button 61, and the operation unit 70 are operation members which input various operation instructions to the system controller 50. The mode switch 60 switches an operation mode of the system controller 50 among a still image recording mode, a moving image shooting mode, a reproducing mode, and the like. The still image recording mode includes an auto imaging mode, an auto scene determination mode, a manual mode, a various scene mode in which an imaging setting is performed for each imaging scene, a program AE mode, and a custom mode. The mode switch 60 directly performs switching among the modes included in the menu button. Alternatively, after the menu button is selected once by the mode switch 60, one of the modes included in the menu button may be selected using another operation member. Similarly, the moving image shooting mode may include a plurality of modes.

A first shutter switch 62 is turned on when the shutter button 61 disposed on the digital still camera 100 is operated halfway, that is, when the shutter button 61 is pressed halfway (an imaging preparation instruction), so that a first shutter switch signal SW1 is generated. An AF process, an AE process, an AWB process, an EF process, and the like are started in response to the first shutter switch signal SW1.

A second shutter switch 64 is turned on when an operation of the shutter button 61 is completed, that is, when the shutter button 61 is fully pressed (an imaging instruction), so that a second shutter switch signal SW2 is generated. The system controller 50 starts a series of operations in an imaging process including a process of reading a signal supplied from the imaging unit 22 in accordance with the second shutter switch signal SW2 to a process of writing image data to the recording medium 200.

Functions are appropriately assigned to the various operation members of the operation unit 70 depending on a scene by selectively operating various functional icons displayed in the display unit 28 so that the operation members function as various functional buttons. Examples of the functional buttons include an end button, a return button, an image feeding button, a jump button, a narrowing-down button, and an attribute change button. When the menu button is pressed, for example, a menu screen used to perform various settings is displayed in the display unit 28. A user may intuitively perform various settings using the menu screen displayed in the display unit 28, a four-direction button indicating a vertical direction and a horizontal direction, and a SET button. The operation unit 70 further includes the touch panel 70a.

A power source controller 80 includes a battery detection circuit, a DC-DC converter, and a switch circuit which switches a block to be energized and detects whether a battery has been attached, a type of the battery, and a remaining battery level. Furthermore, the power source controller 80 controls the DC-DC converter in accordance with results of the detections and an instruction issued by the system controller 50 so as to supply a required voltage to the various units including the recording medium 200 for a required period of time. The power source switch 72 is capable of turning on or off the power source of the digital still camera 100.

A power source unit 30 is constituted by a primary battery, such as an alkaline battery or a lithium battery, a secondary battery, such as an NiCd battery, an NiMH battery, or an Li battery, an AC adapter, and the like. A recording medium I/F 18 is connected to the recording medium 200, such as a memory card or a hard disk. The recording medium 200 is a memory card constituted by a semiconductor memory, an optical disc, a magnetic disk, or the like which records captured images.

A communication unit 54 is used for wireless connection or wired connection through a cable to transmit or receive a video signal or an audio signal. The communication unit 54 may be connected to a wireless local area network (LAN) or the Internet. The communication unit 54 is capable of transmitting images captured by the imaging unit 22 (including a live view) and images recorded in the recording medium 200 and capable of receiving image data and various other information from an external apparatus. An orientation detection unit 55 detects an orientation of the digital still camera 100 relative to a direction of gravitational force. It may be determined whether an image is captured by the imaging unit 22 of the digital still camera 100 in a horizontal state or a vertical state in accordance with an orientation detected by the orientation detection unit 55. The system controller 50 may add direction information corresponding to the orientation detected by the orientation detection unit 55 to an image file of an image captured by the imaging unit 22 or record an image after rotating the image. Examples of the orientation detection unit 55 include an acceleration sensor or a gyro sensor, When looking into the finder 16, the user may view an object displayed in the finder display unit 58 (viewable). The eye approach sensor 57 is an object detection unit (an eye approach detection unit) which detects approach of an object within a range closer than a predetermined distance, such as 1 cm or 2 cm, (within a predetermined distance). When the eye approach sensor 57 detects approach of an object (an eye) of the user approaching the finder 16 with an eye (the user looking into the eye approach section), the display unit 28 is switched to the finder display unit 58 so that the user may view a state of the object. Furthermore, when detecting that an object (an eye) is separated by a predetermined distance or more, the eye approach sensor 57 stops display of an item or the like in the finder display unit 58 and switches the display to the display unit 28.

Note that, in the case where the operation unit 70 includes the touch panel 70a, the system controller 50 may detect the following operation or the following state on the touch panel 70a.

A touch on the touch panel 70a newly performed by a finger or a pen, that is, a start of a touch (hereinafter referred to as "Touch-Down").

A state in which the touch panel 70a is touched by a finger or a pen (hereinafter referred to as "Touch-On").

A movement of a finger or a pen touching the touch panel 70a (hereinafter referred to as "Touch-Move").

Separation of a finger or a pen from the touch panel 70a, that is, an end of a touch (hereinafter referred to as "Touch-Up").

A state in which nothing has touched the touch panel 70a (hereinafter referred to as "Touch-Off").

When Touch-Down is detected, Touch-On is simultaneously detected. In general, after Touch-Down, Touch-On is continuously detected until Touch-Up is detected. Touch-Move is detected while Touch-On is detected. Even if Touch-On is detected, Touch-Move is not detected unless a touch position is changed. Touch-Off is detected after Touch-Up of all fingers or all pens which have been in the Touch-On state is detected.

The operations, the states, and position coordinates of a touched finger or a touched pen on the touch panel 70a are transmitted to the system controller 50 which determines an operation which has been performed on the touch panel 70a based on the transmitted information. As for Touch-Move, a movement direction of a finger or a pen moving on the touch panel 70a may also be determined for each of vertical and horizontal components on the touch panel 70a based on a change of a position coordinate. Furthermore, it is assumed that a stroke is applied through Touch-Down, certain Touch-Move, and Touch-Up on the touch panel 70a. An operation of quickly applying a stroke is referred to as "flicking". The flicking is an operation of quickly moving a finger touching the touch panel 70a by a certain distance and separating the finger from the touch panel 70a, that is, an operation of quickly sliding the finger on the touch panel 70a such that the touch panel 70a is flicked by the finger. It may be determined that the flicking has been performed when Touch-Move in a predetermined distance or more and at a predetermined speed or more is detected and Touch-Up is detected immediately after Touch-Move. Furthermore, it is determined that dragging is performed when Touch-Move in the predetermined distance or more and at a speed less than the predetermined speed is detected. As for the touch panel 70a, any one of various types of method including a resistance film method, a capacitance method, a surface acoustic wave method, an infrared method, an electromagnetic induction method, an image recognition method, and an optical sensor method may be employed. Any method may be employed including a method for detecting a touch by detecting contact on the touch panel 70a and a method for detecting a touch by detecting approach of a finger or a pen to the touch panel 70a.

First Embodiment

Next, a power saving transition process according to a first embodiment will be described with reference to FIGS. 3A and 3B. This process is realized when the system controller 50 develops a program recorded in the nonvolatile memory 56 in the system memory 52 and executes the program. This process is started when the digital still camera 100 is powered.

In step S301, the system controller 50 starts driving for imaging performed by the imaging unit 22.

In step S302, the system controller 50 displays an image captured by the imaging unit 22 (a live-view image or an LV image) in the display unit 28 which is a backside display panel disposed outside the finder 16. Furthermore, the system controller 50 displays information on the imaging, such as a shutter speed and ISO sensitivity, along with the captured image. Note that, when the menu button is pressed, the menu screen is displayed, whereas when the reproducing mode is entered, a reproducing screen is displayed.

In step S303, the system controller 50 turns on the eye approach sensor 57. When the eye approach sensor 57 is turned on, approach of an object to the finder 16 or separation of the object from the finder 16 may be detected. When the eye approach sensor 57 is turned off, approach of the object to the finder 16 is not detected. The On state or the Off state of the eye approach sensor 57 is recorded in the system memory 52.

In step S304, the system controller 50 resets a power saving timer L and starts counting of the power saving timer L. The power saving timer L is counted by the system timer 53, and a counted time is successively recorded in the system memory 52. A time of the power saving timer L is settable in the menu screen in a range from 30 seconds to 3 minutes in a unit of 30 seconds.

In step S305, the system controller 50 resets an eye approach sensor timer C and starts counting of the eye approach sensor timer C. The eye approach sensor timer C is counted by the system timer 53, and a counted time is successively recorded in the system memory 52. A time of the eye approach sensor timer C is settable in the menu screen in a range from 30 seconds to 3 minutes in a unit of 30 seconds.

In step S306, the system controller 50 determines whether the eye approach sensor 57 is in an ON state. When the determination is affirmative, the process proceeds to step S307, and otherwise, the process proceeds to step S311.

In step S307, the system controller 50 determines whether the eye approach sensor 57 has detected approach of an object to the finder 16. When the determination is affirmative, the process proceeds to step S308, and otherwise, the process proceeds to step S309. Note that the result of determination performed it step S307 may be based on a display switching operation performed by the user. The user may select an auto mode which gives priority on a result of the detection performed by the eye approach sensor 57 or a manual mode which gives priority on a switching instruction issued by an operation on a button performed by the user as a method for switching a display destination.

In step S308, the system controller 50 turns off the display in the display unit 28 and turns on the display in the finder display unit 58. Specifically, when a live-view image is displayed in the display unit 28, display of the live-view image in the display unit 28 is switched to display in the finder display unit 58. Note that, since the eye approach sensor 57 is in the OFF state in the manual mode, when display is performed using the display unit 28, a process in step S308 and step S310 is not performed even if the user looks into the finder 16.

In step S309, the system controller 50 turns on the display in the display unit 28 and turns off the display in the finder display unit 58. Specifically, when a live-view image is being displayed in the finder display unit 58, display of the live-view image in the finder display unit 58 is switched to display in the display unit 28.

In step S310, the system controller 50 resets the power saving timer L and starts counting of the power saving timer L.

In step S311, the system controller 50 determines whether a key operation has been performed. The key operation includes a button operation which does not include a touch operation on the touch panel 70a, an operation on the shutter button 61, and an operation on the power source switch 72, in the operation unit 70. When the determination is affirmative, the process proceeds to step S312, and otherwise, the process proceeds to step S316.

In step S312, the system controller 50 determines whether the operation determined in step S311 is an instruction for imaging, that is, a press on the shutter button 61. When the determination is affirmative, the process proceeds to step S313, and otherwise, the process proceeds to step S314.

In step S313, the system controller 50 performs imaging. Specifically, the system controller 50 records the image captured by the imaging unit 22 in the recording medium 200.

In step S314, the system controller 50 determines whether the power saving transition process is to be terminated. Specifically, it is determined whether the power source switch 72 has been pressed in the key operation determined in step S311 so that the digital still camera 100 is powered off. When it is determined that the power saving transition process is to be terminated, the process is terminated, and otherwise, the process proceeds to step S315.

In step S315, the system controller 50 performs a process corresponding to the key operation determined in step S311. In step S311, when the mode switch 60 is operated, mode switching is performed, and when the controller wheel 73 is rotated, a process assigned to the controller wheel 73, such as change of setting values in the imaging items, is executed.

In step S315, examples of the process include change of the setting values of the imaging items including the shutter speed, the ISO sensitivity, and the white balance, transition to the menu screen, and transition to the reproducing mode.

In step S316, the system controller 50 determines whether a touch operation on the touch panel 70a has been detected. When the determination is affirmative, the process proceeds to step S317, and otherwise, the process proceeds to step S318.

In step S317, the system controller 50 brings the display unit 28 into a display state if the display unit 28 is in a non-display state and executes a process corresponding to the touch operation detected in step S316. The process corresponding to the touch operation is a setting of an AF position or change of the setting values of the imaging items when a live-view image is displayed in the display unit 28 or the finder display unit 58. The process is a selection of one of menu items or the setting values, enlargement of an image, or a switching operation when the menu screen or the reproducing screen is displayed.

In step S318, the system controller 50 determines whether the eye approach sensor 57 is in an ON state. When it is determined that the eye approach sensor 57 is in the ON state, the process proceeds to step S319, and otherwise, the process proceeds to step S325.

In step S319, the system controller 50 determines whether the eye approach sensor timer C has timed out, that is, whether a set predetermined period of time has elapsed. The eye approach sensor timer C is timed out if a key operation or a touch operation is not performed by the user for a predetermine period of time irrespective of a result of detection of approach of an object performed by the eye approach sensor 57. When the eye approach sensor timer C is timed out, the process proceeds to step S320, and otherwise, the process proceeds to step S323.

In step S320, the system controller 50 determines whether the eye approach sensor 57 has detected approach of an object similarly to step S307, When the determination is affirmative, the process proceeds to step S321, and otherwise, the process proceeds to step S322.

In step S321, the system controller 50 turns off the display in the finder display unit 58. Since the eye approach sensor timer C is timed out in step S319, the finder display unit 58 is in the non-display state even if the user looks into the finder 16. On the other hand, if the user does not look into the finder 16 but views the display unit 28 on a back surface (or eye approach is not detected) when the eye approach sensor timer C is timed out, the display unit 28 is not brought into the non-display state. Specifically, when the eye approach sensor timer C is timed out, unlike a case where the power saving timer L is timed out, display in the finder 16 and detection by the eye approach sensor 57 in step S322 are not performed as described below, In step S322, the system controller 50 stops the detection performed by the eye approach sensor 57 (disabled). Specifically, even if an object approaches the finder 16 or is separated from the finder 16, the approach or the separation is not detected since detection of the eye approach sensor 57 is stopped. In this way, when the eye approach sensor timer C is timed out in step S319 and detection of the eye approach sensor 57 is stopped, the eye approach sensor 57 does not detect approach of an object even if an abdomen of the user is brought into contact with the finder 16. Accordingly, even if an abdomen is in contact with the finder 16 in a state in which the digital still camera 100 is hung around a user's neck, the eye approach sensor 57 does not detect approach of an object, and therefore, the power saving timer L is not reset and counting is continuously performed. If the detection of the eye approach sensor 57 is not stopped, it takes time to enter the power saving state, and therefore, power consumption is increased. However, if the detection of the eye approach sensor 57 is stopped, the power saving state is easily entered, Furthermore, the eye approach sensor timer C may not be provided, and the power saving timer L may not be reset from the beginning in accordance with the detection performed by the eye approach sensor 57. However, in a case where the user does not perform any operation although looking into the finder 16, if a power saving state is immediately entered, the user is required to perform an unrequired operation so that the power saving state is not entered, Alternatively, the power saving state may be unintentionally entered while a shooting chance is waited, and accordingly, a shooting chance may be missed while restoration from the power saving state is performed. Note that the system controller 50 may ignore detection of the eye approach sensor 57 instead of stop of the detection of the eye approach sensor 57.

In step S323, the system controller 50 determines whether the eye approach sensor timer C indicates a time 5 seconds before the time out (a predetermined time before the time out). When the determination is affirmative, the process proceeds to step S324, and otherwise, the process proceeds to step S325.

In step S324, the system controller 50 displays a guide indicating that the finder display unit 58 is brought into the non-display state on an image which is being displayed in the finder display unit 58 in an overlapping manner. Content of the guide indicates that the finder 16 is turned off or display is started when a button is operated. Note that the guide may indicate that the eye approach sensor 57 becomes disabled. The guide is displayed on a live-view image when the live-view image is being displayed in the finder display unit 58, on a menu screen when the menu screen is displayed, and on a reproducing image when a reproducing screen is displayed in an overlapping manner.

In step S325, the system controller 50 determines whether the power saving timer L has been timed out. When the determination is affirmative, the process proceeds to step S326, and otherwise, the process proceeds to step S306.

In step S326, the system controller 50 brings the finder display unit 58 and the display unit 28 into a non-display state, and furthermore, the driving for imaging including an imaging process performed by the imaging unit 22 is stopped. If the finder display unit 58 has been brought into the non-display state in step S321, only the display unit 28 is brought into the non-display state. When the finder display unit 58 and the display unit 28 are brought into the non-display state, control of the image processor 24, the memory controller 15, and the D/A converter 13 is not required, and therefore, power consumption is considerably reduced. When the finder display unit 58 has been brought into the non-display state in step S321, both of the display units are in the non-display state. However, control on the image processor 24, the memory controller 15, and the D/A converter 13 is performed, and therefore, a degree of reduction of power consumption is smaller than that in step S326. Although the control on the image processor 24, the memory controller 15, and the D/A converter 13 may be stopped in step S321, a period of time required for display to be performed again is longer than that in a case where the control is not stopped, and therefore, the control on all the configurations may not be preferably stopped before the power saving state is entered.

In step S327, the system controller 50 determines whether a key operation has been performed. When the determination is affirmative, the process proceeds to step S301, and otherwise, the process proceeds to step S328. Restoration from the power saving state is realized only by a key operation (or detection of approach of an eye when the eye approach sensor 57 is enabled (ON), which will be described below) instead of a touch operation, and therefore, the process proceeds to step S301 when a key operation is performed. Then the driving for imaging is started in step S301 and display on the display unit 28 is performed in step S302. Note that if the eye approach sensor 57 detects approach of an object at the time of the restoration from the power saving state, display may not be performed on the display unit 28 in step S302 but display may be performed on the finder display unit 58.

In step S328, the system controller 50 determines whether the eye approach sensor 57 has been enabled (ON) (that is, whether detection is not stopped). When it is determined that the eye approach sensor 57 has been enabled (ON), the process proceeds to step S329, and otherwise, the process proceeds to step S327. Specifically, when the eye approach sensor 57 has not been enabled, the restoration from the power saving state is realized only by a key operation.

In step S329, the system controller 50 determines whether the eye approach sensor timer C has been timed out. When it is determined that the eye approach sensor 57 has been enabled in step S328, it is determined that the eye approach sensor timer C has not been timed out. If the eye approach sensor timer C has not been timed out even in the power saving state, the system controller 50 detects approach of an object to the finder 16 in step S330. A state in which detection by the eye approach sensor 57 is not stopped even in the power saving state may occur when the user does not perform any operation and does not look into the finder 16. For example, when the user waits for a shooting chance while viewing a live-view image displayed in the display unit 28, the eye approach sensor 57 may not perform detection even in the power saving state. Accordingly, when the user performs an operation of looking into the finder 16, it is determined that the user is using the digital still camera 100. When the eye approach sensor timer C is timed out while the user does not look into the finder 16, the eye approach sensor 57 stops detection. When the eye approach sensor timer C is timed out, the process proceeds to step S331, and otherwise, the process proceeds to step S330.

In step S330, the system controller 50 determines whether the eye approach sensor 57 has detected approach of an object similarly to step S307 and step S320. When the determination is affirmative, the process proceeds to step S301 where the restoration from the power saving state is performed, and otherwise, the process proceeds to step S327 where a key operation or detection of approach of an eye is waited.

In step S331, the system controller 50 stops the detection performed by the eye approach sensor 57 (disabled). Accordingly, the restoration from the power saving state caused by detection of approach to the finder 16 is not realized. When it is determined that the eye approach sensor 57 is enabled in step S328, it is highly likely that the user does not perform any operation and does not look into the finder 16. However, it is highly likely that the user does not hold the digital still camera 100 since the eye approach sensor 57 is disabled. Accordingly, the restoration from the power saving state is not performed even if the user looks into the finder 16 and the restoration is realized only by a key operation. By this, the restoration from the power saving state is not unintentionally performed, and accordingly, power saving is enhanced. Furthermore, although the power saving function is restored (to a normal state) when a key operation is performed and when the eye approach sensor 57 in the ON state detects eye approach, an auto power off function may be provided so that the imaging apparatus is powered off when a key operation is not performed for a predetermined period of time after the power saving state is entered in step S331.

According to the embodiment described above, the possibility that large amount of electric power is unintentionally consumed may be reduced without degrading operability of the camera. Even in a case where approach of an object to the finder 16 is detected when the digital still camera 100 is hung around a user's neck and the user does not perform any operation, the power saving state may be entered, and accordingly, large electric power may not be unintentionally consumed. When the timer to enter the power saving state is reset in response to detection of eye approach, it is difficult to enter the power saving state as long as the approach of an object to the finder 16 is detected. However, use of the eye approach sensor timer C enables transition to the power saving state. Furthermore, if the eye approach sensor timer C is not provided and the detection of the eye approach sensor 57 is not taken into consideration in the transition to the power saving state, the power saving state is entered even when the user looks into the finder 16 or views the display unit 28 without any operation.

Note that, as for the touch detected in step S316, it may be determined that a touch is not detected when the touch is performed on the touch panel 70a by a large object having a predetermined area or more. Specifically, when an object having a certain area, such as an abdomen of the user, is in contact with the touch panel 70a, the determination in step S316 may be negative since it is determined that the touch is unintentionally performed.

Furthermore, in a state in which a touchpad operation, such as a change of an AF position performed by a touch operation on the touch panel 70a, is accepted, the timer may not be reset in response to the touch operation.

Furthermore, although the case where the eye approach sensor 57 detects approach of an object to the finder 16 is described, the touch panel 70a may detect approach of an object.

Next, a concrete example of the foregoing first embodiment will be described with reference to FIGS. 4A to 7B. In FIGS. 4A to 7B, axes of abscissae denote time, and the display unit 28 and the finder display unit 58 are examples of an output destination, and an ON state and an OFF state of driving for imaging are illustrated. Furthermore, tines of the power saving timer L and the eye approach sensor timer C are also illustrated. When remaining times of the individual timers become 0, the power saving state and the OFF state of the eye approach sensor 57 are entered, respectively.

Figure 4B:
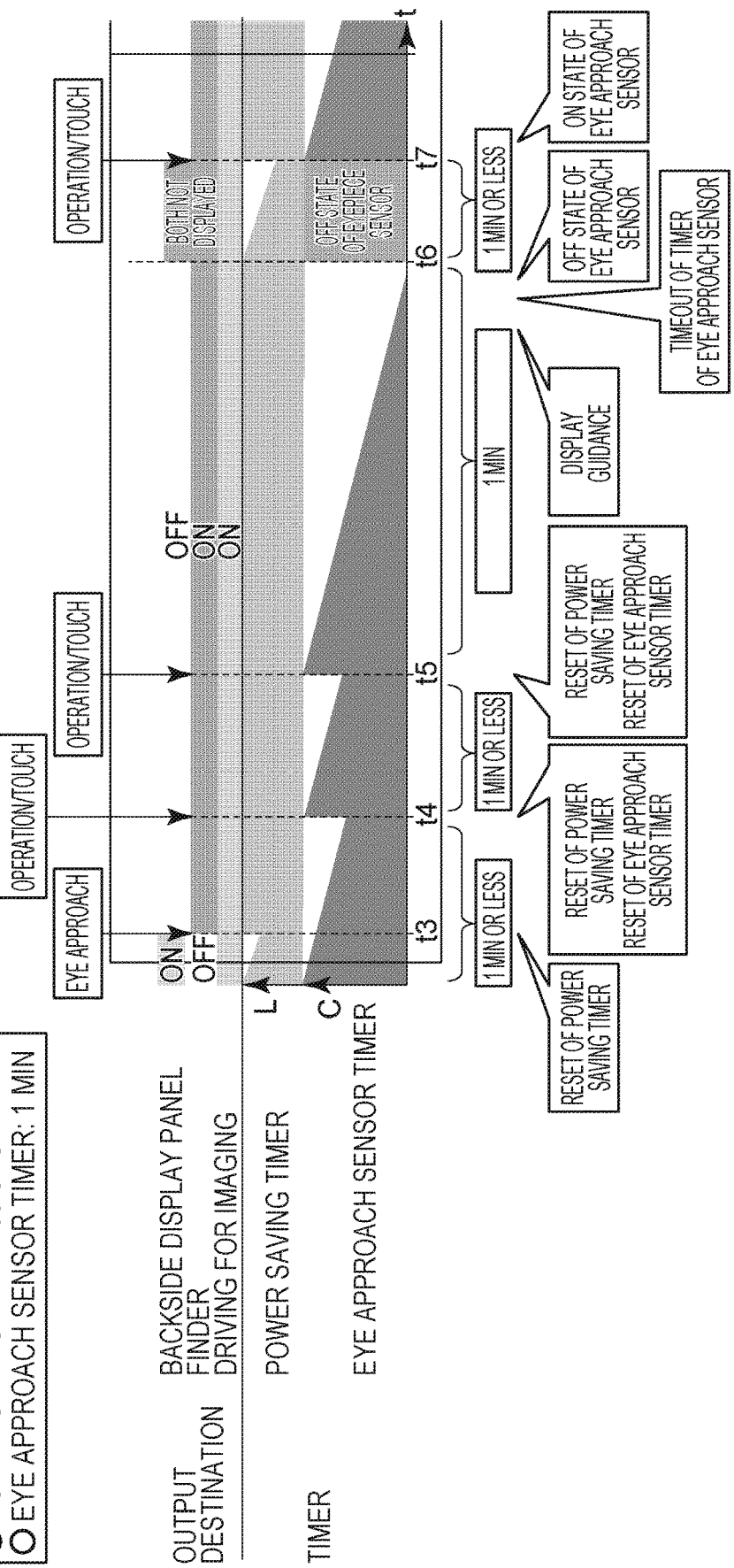

FIGS. 4A and 4B are diagrams illustrating a state in which the power saving timer L and the eye approach sensor timer C are individually timed out. Specifically, FIG. 4A is a diagram illustrating a state in which the user looks into the finder 16. When a key operation or a touch operation is performed at a time point t1, the power saving timer L and the eye approach sensor timer C are reset and counting is performed again with time until a time point t2. Furthermore, when a key operation or a touch operation is further performed at the time point t2, the timers are reset. However, the timers are timed out if operations are not performed after the reset. FIG. 4B is a diagram illustrating a state in which the user looks into the finder 16. When eye approach is detected at a time point t3, a display destination is switched from the display unit 28 to the finder display unit 58. Furthermore, at a time point t4, a period of time in which operations are not performed does not exceed a time of the eye approach sensor timer C (smaller than a first time period) and furthermore, does not exceed a time of the power saving timer L (smaller than a second time period), and accordingly, the power saving timer L is reset when eye approach is detected. When a key operation or a touch operation is performed at the time point t4, the eye approach sensor timer C is reset. In this case, the power saving timer L does not perform counting since eye approach is detected. If operations are not performed until a time point t6 after a key operation or a touch operation is performed at a time point t5 (a state in which operations are not performed continues for the first period of time or more), the eye approach sensor timer C is timed out. In a period of time from the time point t5 to the time point t6, counting of the power saving timer L is not performed since eye approach is detected. When the eye approach sensor timer C is timed out at the time point t6, the eye approach sensor 57 is turned off, and accordingly, the display unit 28 and the finder display unit 58 are brought into a non-display state. In a period of time from the time point t6 to a time point t7, counting of the power saving timer L is performed since the eye approach sensor 57 is in the OFF state.

Figure 5A:
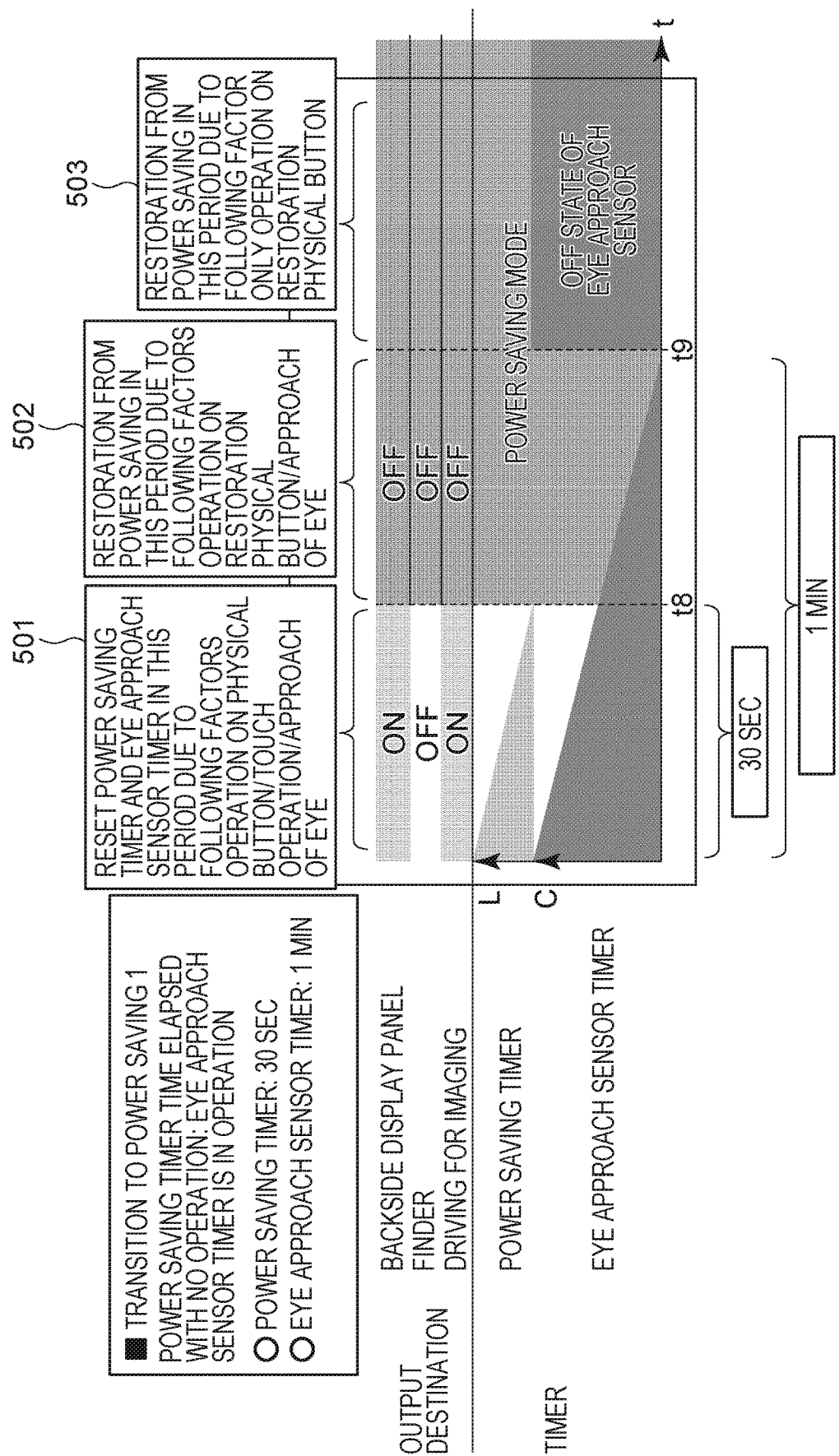

FIGS. 5A and 5B are diagrams illustrating factors for restoration or reset from the power saving state. Specifically, FIG. 5A is a diagram illustrating a state in which the user does not look into the finder 16 and a time of the power saving timer L is shorter than that of the eye approach sensor timer C. A display destination before a time point t8 is the display unit 28. At the time point t8, when the power saving state is entered, the display in the display unit 28 and the driving for imaging are stopped. In this case, the eye approach sensor timer C has not been timed out, and therefore, restoration from the power saving state is available by detection of an approaching object performed by the eye approach sensor 57 or a key operation in a period of time from the time point t8 to a time point t9. When the eye approach sensor timer C is timed out at the time point t9, the eye approach sensor 57 is turned off, and accordingly, the restoration from the power saving state and restoration from the OFF state of the eye approach sensor 57 may be realized only by a key operation. FIG. 5B is a diagram illustrating a state in which the user does not look into the finder 16 and a time of the power saving timer L is longer than that of the eye approach sensor timer C. When eye approach is detected, the power saving timer L is reset until a time point t10 when the eye approach sensor timer C is timed out. However, when the eye approach sensor 57 is turned off at the time point t10, the power saving timer L is not reset even if eye approach is detected.

Figure 6A:
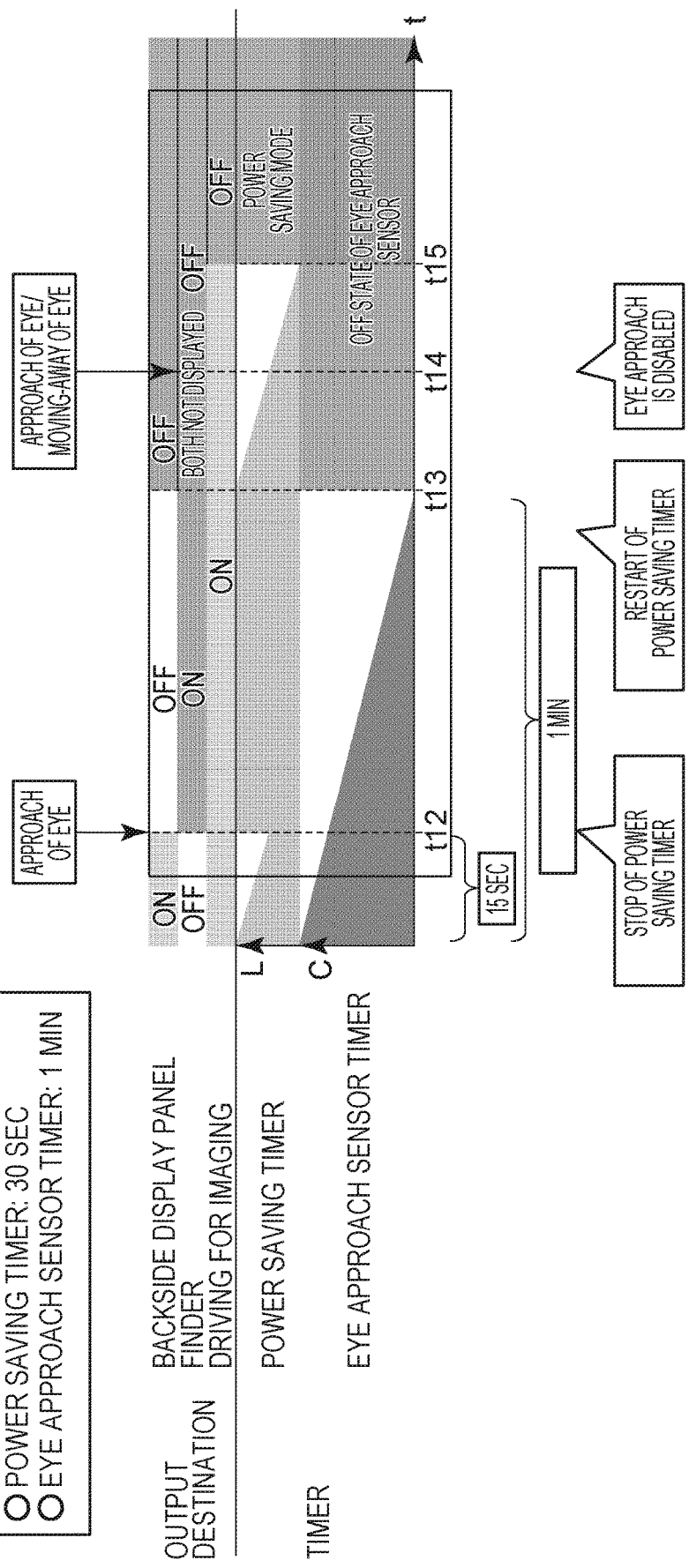

FIGS. 6A and 6B are diagrams illustrating a state of counting of the power saving timer L and the eye approach sensor timer C when an eye approach state or an eye separation state (an eye moves away from the finder 16) is detected. In FIG. 6A, although the power saving timer L is reset since eye approach is detected at a time point t12, if time passes until a time point t13 without any operation, the eye approach sensor timer C is timed out and the eye approach sensor 57 is brought into an OFF state. Even if the eye approach state is changed to the eye separation state at a time point t14, since the eye approach sensor 57 has been in the off state, the power saving timer L is not reset unless the user performs a key operation or a touch operation, and accordingly, the power saving state is entered at a time point t15. Specifically if the non-operation state is continued for a period of time from the time point t13 to the time point t15 (a non-operation state continues for the second period of time), the power saving state is entered. According to FIG. 6B, reset caused by a change between eye approach and an eye separation of the eye approach sensor timer C is not performed. Although the eye approach sensor 57 detects approach of an object at a time point t16, separation of the object at a time point t17, and approach at a time point t18, the eye approach sensor timer C is not reset. Meanwhile, counting of the power saving timer L is not performed in a state in which the eye approach sensor 57 detects approach of an object, and the power saving timer L is reset when separation of the object is detected. When the eye approach sensor timer C is timed out at a time point t20, display in the display unit 28 remains although the eye approach sensor 57 is turned off. Since the eye approach sensor 57 detects an object moving away at a time point t19, counting of the power saving timer L is started at the time point t19 and the power saving timer L is timed out at a time point t21. The power saving timer L is not reset even if the eye approach sensor 57 detects approach of an object again in a period of time from the time point t20 to the time point t21.

Figure 7B:
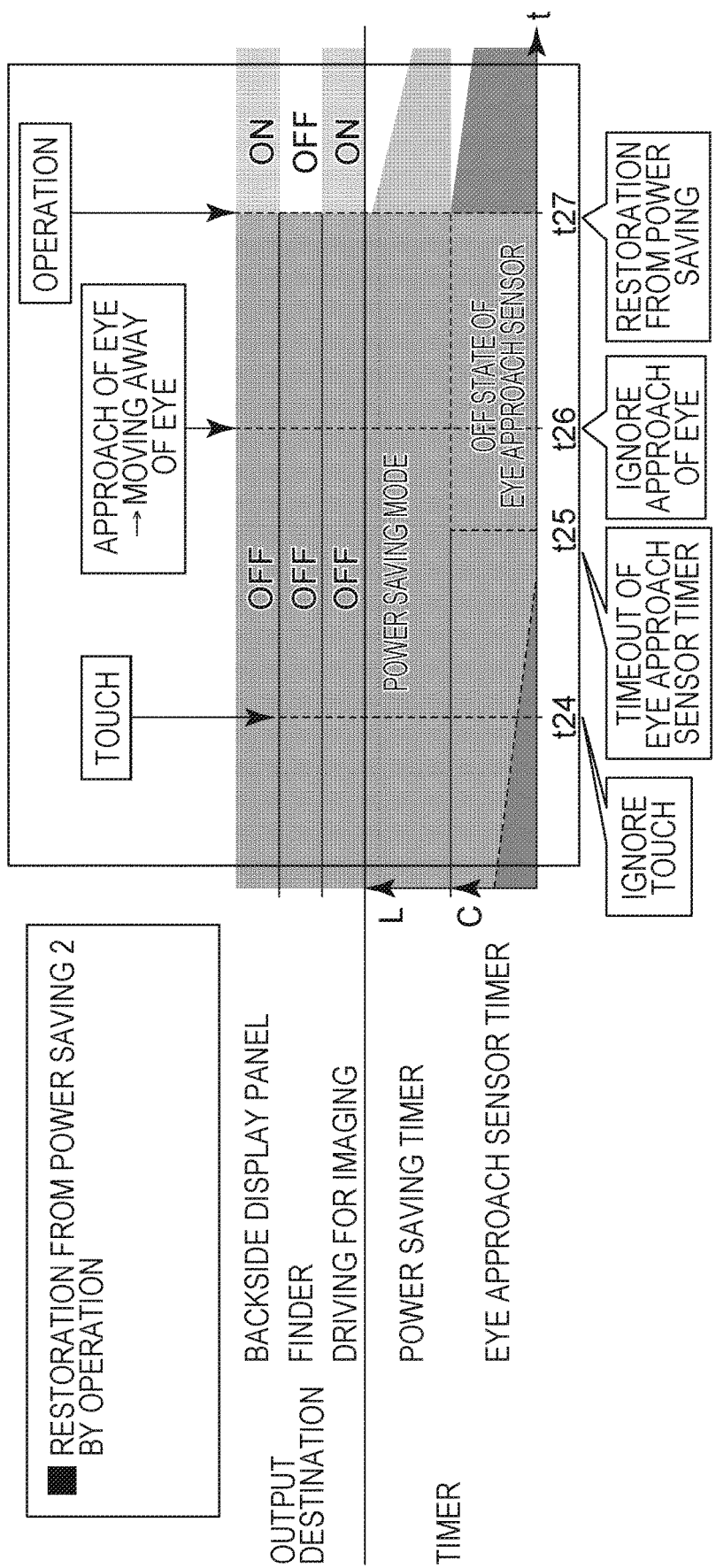

FIGS. 7A and 7B are diagrams illustrating the case where restoration from the power saving state (S326) is realized. According to FIG. 7A, the eye approach sensor timer C is not timed out when the eye approach sensor 57 is first in the ON state, and restoration is not performed even if a touch operation is performed at a time point t22 after the power saving state is entered. Furthermore, when the eye approach sensor 57 detects approach of an object, the restoration from the power saving state is performed. According to FIG. 7B, as with FIG. 7A, the eye approach sensor timer C is not timed out when the eye approach sensor 57 is first in the ON state, the eye approach sensor timer C is not reset even if a touch operation is performed at a time point t24 after the power saving state is entered, and the eye approach sensor timer C is timed out at a time point t25. Accordingly, the eye approach sensor 57 is brought into an OFF state as described in step S331, and thereafter, even if the eye is moved away at a time point t26, the restoration from the power saving state is not performed since the eye approach sensor 57 is in the OFF state. However, when a key operation is performed at a time point t27, the restoration from the power saving state is realized. After the restoration from the power saving state, the driving for imaging is started and the display unit 28 performs display.

In this way, since the eye approach sensor timer C is provided, the eye approach sensor 57 is turned off irrespective of a state of detection of approach of an object performed by the eye approach sensor 57, and thereafter, if a non-operation state is continued, a power saving state may be entered. Furthermore, when the eye approach sensor 57 is turned off, detection of approach performed by the eye approach sensor 57 does not cause the restoration from the power saving state. However, when the eye approach sensor 57 is not in the OFF state, detection of approach performed by the eye approach sensor 57 causes the restoration from the power saving state.

The digital still camera 100 used by the user has a plurality of use patterns at a time of imaging. As a first pattern, imaging is to be performed while the user looks into the finder 16. As a second pattern, although the user hanging the digital still camera 100 around the neck or the shoulder does not currently perform any operation, imaging is to be performed in a shooting chance. As a third pattern, imaging is to be performed while the display unit 28 on the back surface is viewed. According to the foregoing embodiment, the user looks into the finder 16 in the first pattern, and accordingly, even if a period of time in which operations are not performed is long, the user may realize that an operation is to be performed since a guide is output 5 seconds before the time out of the eye approach sensor timer C. In the second pattern, even if an eye approach state is detected while the user does not look into the finder 16, the eye approach sensor 57 is turned off if a certain predetermined period of time has elapsed without any operation, and accordingly, the power saving state may be entered even if an abdomen is in contact with the finder 16. In the third pattern, although the eye approach sensor 57 is turned off if a certain period of time has elapsed without any operation, if the power saving states is not entered, the display on the back surface is continued, and accordingly, visibility is not degraded. Furthermore, if the power saving state is entered without turning off the eye approach sensor 57, the restoration from the power saving state may be realized when the user looks into the finder 16. It is unlikely that a non-operation period in a state in which the user holds the digital still camera 100 irrespective of whether the user looks into the finder 16 is longer than a period of time in which the user carries the digital still camera 100 hanging around the neck.

Second Embodiment

Figure 8A:
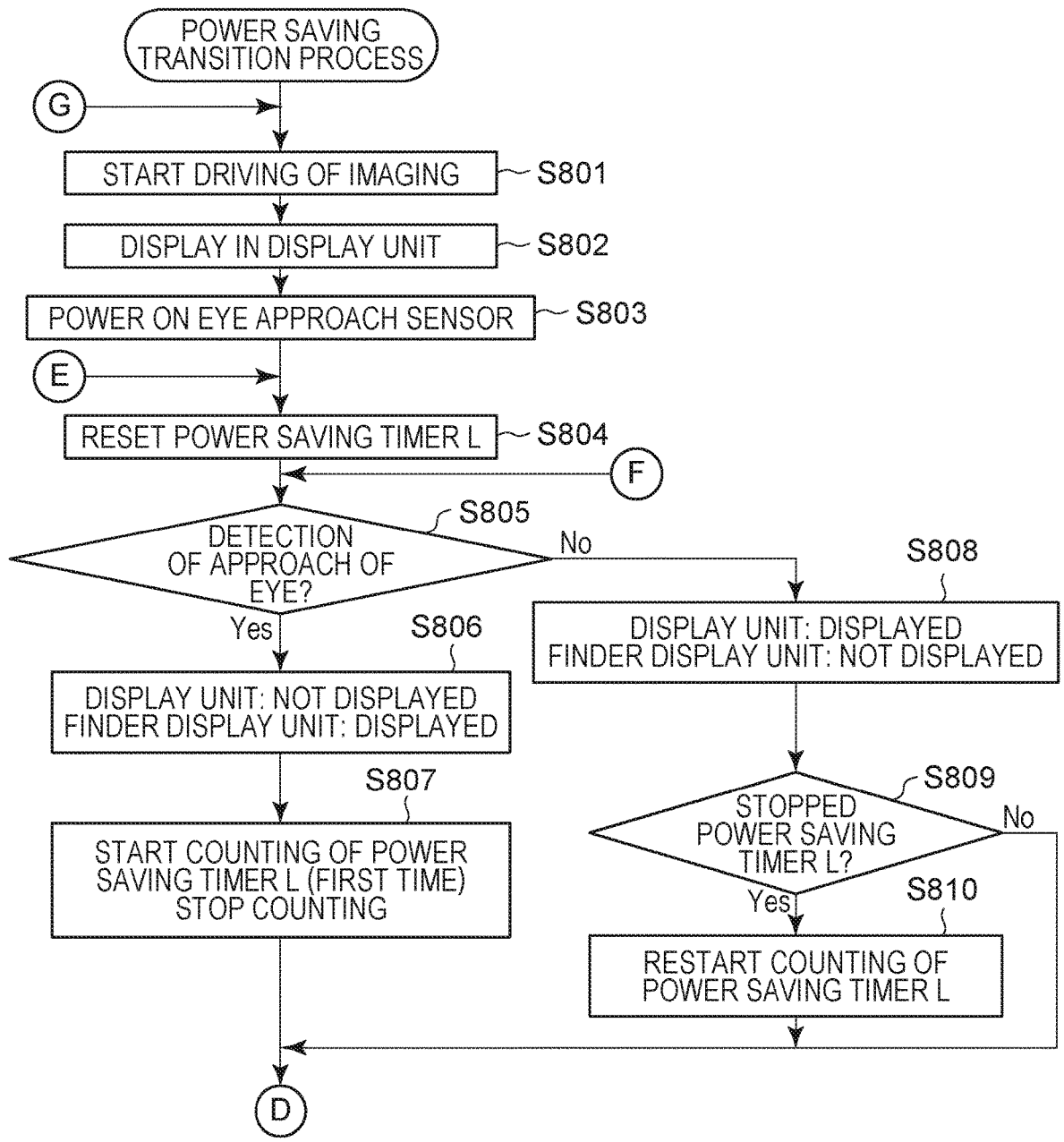

A configuration of a digital still camera 100 according to a second embodiment is the same as that illustrated in FIGS. 1 and 2 of the first embodiment. The second embodiment is different from the first embodiment in that the eye approach sensor timer C according to the first embodiment is not provided, and a counting method employed in a power saving timer L is different from that of the first embodiment. According to the second embodiment, an eye approach sensor 57 repeatedly detects approach and non-approach of an object (a body) when the user walks while hanging the digital still camera 100 around the neck or the shoulder, and accordingly, a total period of time in which operations are not performed and approach of an object is detected is measured. If the measured total period of time (the power saving timer L) is timed out, a power saving state is entered. The second embodiment will be described with reference to FIGS. 8A and 8B. A power saving transition process of FIGS. 8A and 8B is realized when a system controller 50 develops a program recorded in a nonvolatile memory 56 in a system memory 52 and executes the program. This process is started when the digital still camera 100 is powered.

Figure 3A:
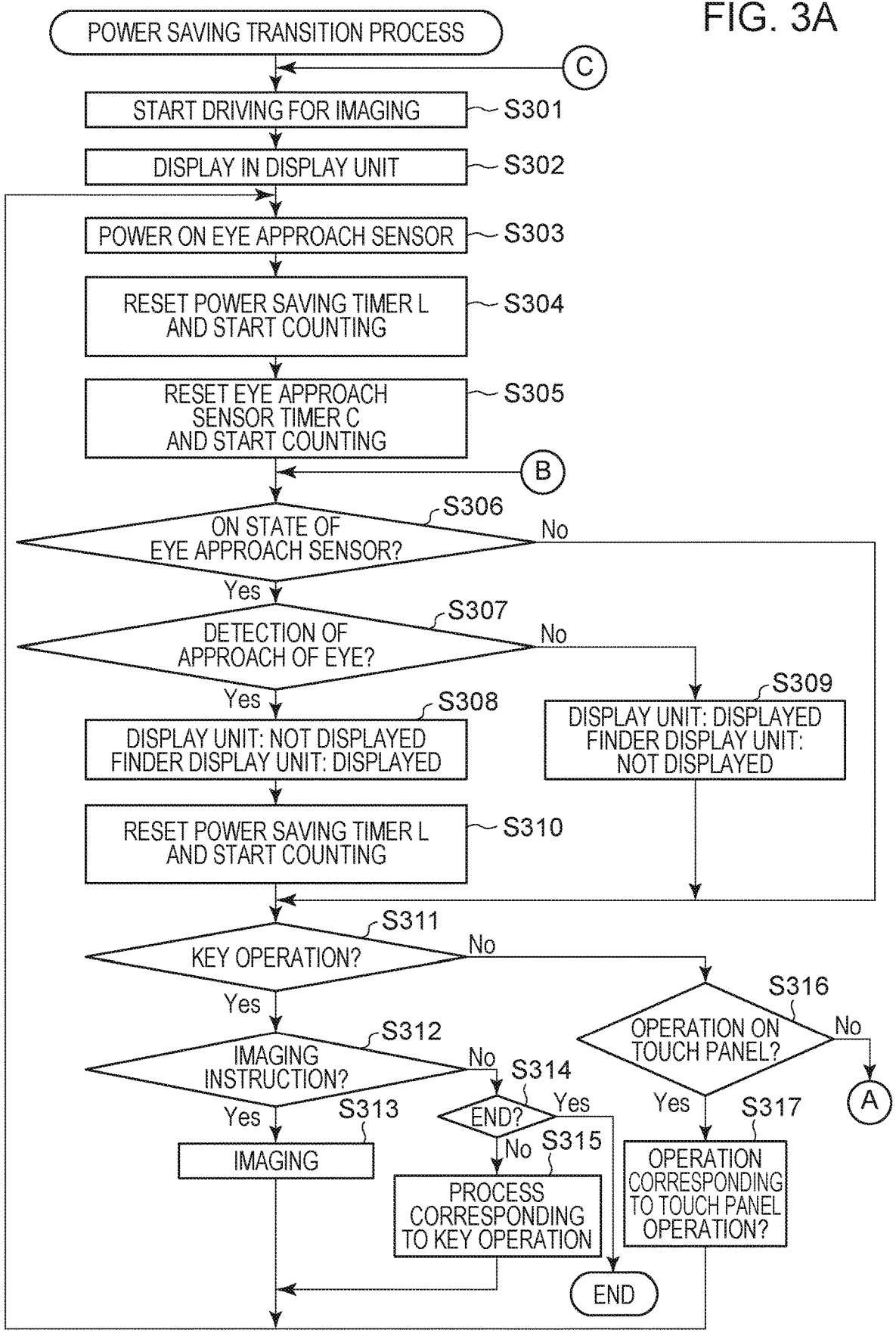
FIGS. 3A and 3B are a flowchart of a power saving transition process according to a first embodiment.
Figure 3B:
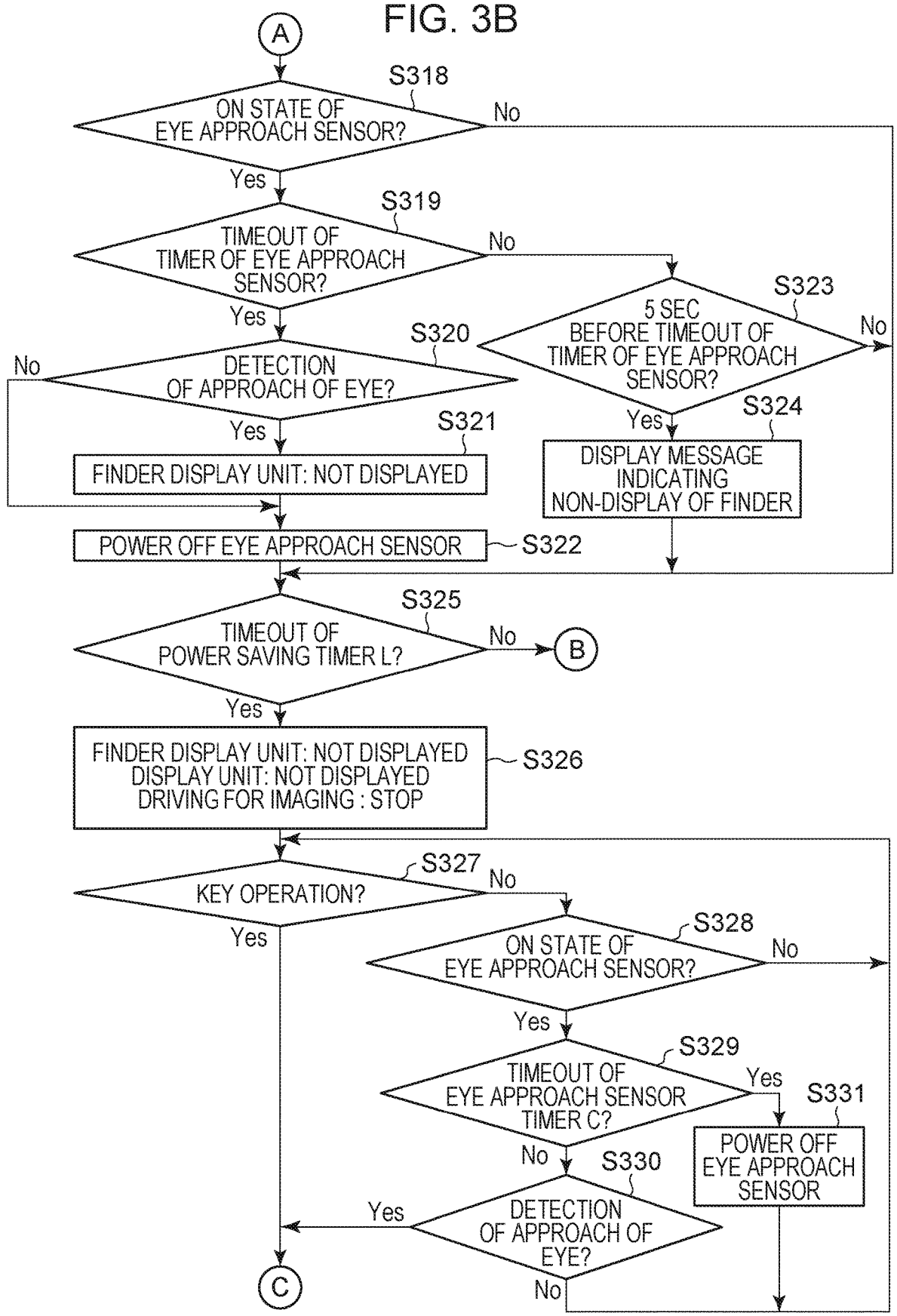

A process from step S801 to step S804 is the same as the process from step S301 to step S304 of FIG. 3A. However, counting of a power saving timer L is not started in step S804.

In step S805, the system controller 50 determines whether the eye approach sensor 57 has detected approach of an object. When the determination is affirmative, the process proceeds to step S806, and otherwise, the process proceeds to step S808.

A process in step S806 is the same as the process in step S308 of FIG. 3A.

In step S807, the system controller 50 stops counting of the power saving timer L or starts counting of the power saving timer L when a process in step S807 is first performed after the process in step S804. When the process in step S807 is performed first, counting of the power saving timer L is started in accordance with an affirmative determination in detection of eye approach in step S805. After a second time onwards, counting of the power saving timer L is stopped while the eye approach sensor 57 detects approach of an object, so that counting of the power saving timer L is not performed and the power saving state is not entered when the user waits without performing any operation while looking into the finder 16. A total time of the stopped power saving timer L is recorded in the system memory 52 but is not reset.

A process in step S808 is the same as the process in step S309 of FIG. 3A.

In step S809, the system controller 50 determines whether the counting of the power saving timer L is being stopped. When the determination is affirmative, the process proceeds to step S810, and otherwise, the process proceeds to step S811.

In step S810, the system controller 50 restarts the counting of the power saving timer L which is being stopped. If the counting of the power saving timer L has not been started, the counting is not performed.

A process from step S811 to step S817 is the same as the process from step S311 to step S317 of FIG. 3A.

In step S818, the system controller 50 determines whether the power saving timer L has been timed out. When the determination is affirmative, the process proceeds to step S819, and otherwise, the process returns to step S805 where an operation of detecting eye approach is waited.

In step S819, the system controller 50 stops display in a finder display unit 58 and the display unit 28, driving for imaging, and detection performed by the eye approach sensor 57.

In step S820, the system controller 50 determines whether a key operation has been performed. When the determination is affirmative, the process returns to step S801 where the restoration from the power saving state is performed, and otherwise, a key operation is waited.

According to the embodiment described above, the possibility that large electric power is unintentionally consumed may be reduced without degrading operability of the user. The counting of the power saving timer L is not performed in a state in which the user looks into the finder 16, and therefore, the possibility that the power saving state is unintentionally entered while the user looks into the finder 16 and waits for a shooting chance is reduced. Furthermore, the counting of the power saving timer L is started when eye approach is detected in step S805, and therefore, when the user waits for a shooting chance while looking into the display unit 28, the power saving state is not entered. On the other hand, in the case where the user has the digital still camera 100 hanging around the neck or the shoulder, if the user does not perform any operation, the eye approach sensor 57 repeatedly performs detection. However, a counter is stopped during the detection, and when a total period of time in which the eye is moved away from the eye approach sensor 57 reaches a predetermined value, the power saving state is entered.

Note that the counting of the power saving timer L may be started in step S804, Furthermore, the counting of the power saving timer L may be started when vibration caused by walking of the user is detected (a periodical orientation change is detected) by the orientation detection unit 55. Furthermore, if a non-operation state is continued for a predetermined period of time or more in the state in which the vibration caused by walking of the user is detected, the power saving timer L may be timed out.

Note that the various control described above to be performed by the system controller 50 may be performed by a single hardware unit or the entire apparatus may be controlled by sharing the processes by a plurality of hardware units.

Although the preferred embodiments of the present disclosure have been described in detail, the present disclosure is not limited to the particular embodiments and various forms are included in the present disclosure without departing from the scope of the present disclosure. Furthermore, the foregoing embodiments are merely examples of the present disclosure, and the embodiments may be appropriately combined with each other.

Furthermore, although the case where the present disclosure is applied to the digital still camera 100 is described in the foregoing embodiment as an example, the present disclosure is not limited to the example and is applicable to an electronic apparatus capable of detecting approach of an object to an approach section. Alternatively, the present disclosure is applicable to apparatuses capable of controlling an electronic apparatus capable of detecting approach of an object to an approach section. Specifically, the present disclosure is applicable to a cellular phone terminal, a mobile image viewer, a printer apparatus including a finder, a digital photo frame, a music player, a game machine, an electronic book reader, and the like.

Other Embodiments

The present disclosure is also realized by executing the following process. Specifically, software (programs) which realizes the functions of the foregoing embodiments is supplied to a system or an apparatus through a network or various recording media and a computer (a central processing unit (CPU), a micro processing unit (MPU), or the like) of the system or the apparatus reads and executes a program code. In this case, the programs and the recording media which record the programs are included in the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151795 filed Aug. 4, 2017, which is hereby incorporated by reference herein in its entirety.

What is claimed is:

1. An electronic apparatus, comprising at least one memory and at least one processor which function as:
   an approach detection unit configured to detect approach of an object to an approach section;
   an operation detection unit configured to detect an operation performed on an operation unit;
   a display controller configured to instruct a display unit to perform display when the approach of the object is detected; and
   a controller configured to:
   enter a first state in which the approach detection unit is in an off state and does not detect approach of an object, the first state entered when a state in which (a) the approach detection unit has detected the approach of the object to the approach section and also (b) the operation unit has not been operated, continues for a first period of time, and
   enter a second state in which power consumption of the electronic apparatus is lower than that in the first state, when a state in which the operation unit has not been operated continues for a second period of time after the controller enters the first state.

2. The electronic apparatus according to claim 1, wherein the display unit is included in a finder which is viewable through a finder section.

3. The electronic apparatus according to claim 1, wherein the electronic apparatus enters the second state when a state in which the operation detection unit is not operated continues for the second period of time while approach of an object to the approach section is not detected, and wherein restoration from the second state is performed when approach of an object to the approach section is detected.

4. The electronic apparatus according to claim 1, wherein in a case where the approach detection unit detects approach of an object to the approach section and the controller enters the second state from a state other than the first state or the second state, the controller does not perform display in the display unit included in the finder which is viewable through the finder section and performs display in a display unit outside the finder section, and in a case where the approach detection unit does not detect approach of an object to the approach section and the controller enters the second state from a state other than the first state or the second state, the controller does not perform display in the display unit outside the finder section.

5. The electronic apparatus according to claim 1, further comprising:
   an imaging unit,
   wherein the imaging unit is activated in the first state and the imaging unit is not activated in the second state.

6. The electronic apparatus according to claim 1, wherein the electronic apparatus is powered off when a state in which the operation detection unit is not operated continues for the second period of time after the controller enters the second state.

7. The electronic apparatus according to claim 1, wherein in a case where the controller enters the second state after entering the first state, the controller does not perform restoration from the second state even when an object approaches the approach section, and in a case where the controller enters the second state but does not enter the first state, the controller performs the restoration from the second state when an object approaches the approach section.

8. The electronic apparatus according to claim 1, wherein the controller displays a guide indicating that the display unit included in the finder does not perform display before a predetermined time point in a case where the controller enters the first state while the display unit included in the finder performs display.

9. The electronic apparatus according to claim 1, wherein the controller causes the approach detection unit not to detect approach of an object in a case where a state in which the operation detection unit is not operated continues for the first period of time.

10. A computer readable recording medium storing programs that cause a computer to function as units included in the electronic apparatus set forth in claim 1.

11. The electronic apparatus according to claim 1, wherein, in the first state, the approach detection unit is in an off state and does not detect approach of an object.

12. The electronic apparatus according to claim 1, wherein the controller enters the first state in a case where a state in which an operation on the operation unit has not been detected continues for the first period of time, regardless of whether the approach detection unit has detected approach of an object to the approach section.

13. A method for controlling an electronic apparatus, comprising:
   detecting, at an approach detection unit, approach of an object to an approach section;
   detecting an operation performed on an operation unit;
   instructing a display unit to perform display when the approach of the object is detected; and
   entering a first state in which the approach detection unit is in an off state and does not detect approach of an object, when a state in which (a) the approach detection unit has detected the approach of the object to the approach section and also (b) the operation detection unit has not been operated, continues for a first period of time.

* * * * *